United States Patent [19]

Saito et al.

[11] Patent Number: 5,274,519
[45] Date of Patent: Dec. 28, 1993

[54] MAGNETIC RECORDING APPARATUS WITH AIR VANE ACTUATED REGULATING MEMBER FOR HEAD SLIDER

[75] Inventors: Hiroaki Saito, Takatsuki; Hisashi Kano, Kadoma; Kiyokazu Imanishi, Higashiosaka; Takao Matsunami, Hirakata; Shinji Shuto, Moriguchi, all of Japan

[73] Assignee: Matsushita Electric Industrial Co., Ltd., Kadoma, Japan

[21] Appl. No.: 728,334

[22] Filed: Jul. 11, 1991

[30] Foreign Application Priority Data

Jul. 12, 1990 [JP] Japan .................. 2-186830

[51] Int. Cl.⁵ .................................. G11B 5/54
[52] U.S. Cl. .................... 360/105; 360/97.01
[58] Field of Search ........................ 360/104–

[56] References Cited

U.S. PATENT DOCUMENTS

| | | | |
|---|---|---|---|
| 3,855,625 | 12/1974 | Garnier et al. | 360/103 |
| 4,538,193 | 8/1985 | Dimmick et al. | 360/137 |
| 4,868,695 | 9/1989 | Quatro | 360/104 |
| 4,903,157 | 2/1990 | Malek | 360/105 |
| 4,933,785 | 6/1990 | Morehouse et al. | 360/78.04 |
| 5,109,310 | 4/1992 | Ohkjita et al. | 360/97.01 X |
| 5,148,339 | 9/1992 | Yoshida | 360/105 |

FOREIGN PATENT DOCUMENTS

| | | | |
|---|---|---|---|
| 61-165869 | 7/1986 | Japan | 360/105 |
| 4-125869 | 4/1992 | Japan | 360/104 |

*Primary Examiner*—John H. Wolff
*Attorney, Agent, or Firm*—Wenderoth Lind & Ponack

[57] ABSTRACT

A magnetic recording apparatus includes an arm, an airvane, a regulating member, and an urging member. The arm has a head slider including a magnetic head at a free end thereof, and is moved by an actuator device between a scan position and a stop position. The arm scans a surface of a disk for reading and/or writing information thereon at the scan position. The head slider is elastically supported on the arm by a flexure. The airvane is disposed adjacent to the disk, and is urged to a first position in opposition to a direction of air flow generated by rotation of the disk. The airvane moves in response to air flow generated by rotation of the disk to a second position in the direction of the air flow. The regulating member is provided at a position corresponding to the stop position of the arm and connected with the airvane. The regulating member moves between a regulating position for regulating vertical movement of the flexure by contacting the flexure and a non-regulating position for moving away from the flexure. The urging member urges the airvane to the first position so that the flexure is regulated by the regulating member when the disk is not rotating.

5 Claims, 16 Drawing Sheets

MAGNETIC RECORDING APPARATUS WITH AIR VANE ACTUATED REGULATING MEMBER FOR HEAD SLIDER

BACKGROUND OF THE INVENTION

1. Field of the Invention

The present invention relates to a magnetic recording apparatus for reading and writing data such as numeric data and image information and which is suitable to be used as a peripheral device of a computer.

2. Description of the Related Art

The magnetic recording apparatus comprises a magnetic disk, a head slider for writing information on the recording surface of the magnetic disk and reading the information, a carriage having an arm thereon for holding the head slider, and an actuator for driving the carriage. Since the gap between the disk and the head slider is slight, there is a great possibility that the disk surface or the head slider will be damaged when they contact each other when a shock or a vibration is applied to the magnetic recording apparatus. It is important to protect the disk surface from damage so that the disk is capable of carrying out a favorable recording.

Conventionally, the head slider is floated over the disk by utilizing positive pressure of an air flow generated by the rotation of the disk, with a slight gap held between the head slider and the disk surface. This type of head slider is urged toward the disk surface by a flexure supporting the head slider elastically. While the disk is rotating, the head slider is floating over the disk with a certain gap provided therebetween due to air bearing effect generated by the air flow. Air bearing effect is not generated when the disk is not rotating. In consideration of this, a landing zone which is a non-recording region is provided on the disk surface so that the head slider does not contact the recording surface of the disk. Thus, the head slider rests on the landing zone when the disk is not rotating. This system is called a contact start/stop system.

According to this system, there is a possibility that the head slider will move out of the landing zone when a shock or a vibration is applied to the apparatus and will damage the recording surface of the disk or the head slider. In order to solve this problem, the head slider is locked in the landing zone when the disk is not rotating and unlocked upon start of the rotation of the disk.

A conventional magnetic recording apparatus empoloying the above-described system is shown in FIGS. 19 and 20. The disks of a plurality of disks 32 are spaced from each other at regular intervals. A flexure 24 serving as an elastic member supports a head slider 23 mounted on the leading end of an arm corresponding to each surface of each disk and mounted on a carriage 25 and scanning the recording surface of the disk 32, with a certain interval provided between the disk 32 and the head slider 23. Upon the rotation of the disk 32, the carriage 25 is driven by an actuator 30 so that the carriage 25 swings about a shaft 27 in the radial direction of the disk 32. Thus, the head slider 23 on each arm on the carriage scans the entire recording region of the disk 32.

When the disk is not rotating, the elastic force of the flexure 24 keeps the head slider 23 in contact with a landing zone 31 provided in an inner zone of the disk 32. During the rotation of the disk 32, the head slider 23 is subjected to an air flow generated by the rotation of the disk 32, thus floating under positive pressure. Then, because of the air bearing effect, the head slider 23 scans the disk surface with a slight gap kept between the disk surface and the head slider 23.

When the disk 32 is not rotating, the air bearing effect is not generated. Therefore, the head slider 23 rests on the landing zone 31 which is a non-recording region so that the head slider 23 is not brought into contact with the recording surface of the disk 32.

According to the carriage locking device of the magnetic recording apparatus of the above construction, an airvane 21 for unlocking the carriage 25 is rotatably supported by a shaft 28, and vanes are provided which extend from the shaft 28 over and below each disk 32. One end of a safety latch 22 is rotatably mounted on the shaft 28 so that the latch 22 rotates about the shaft 28 interlocking with the pivotal motion of the airvane 21.

With the disks 32 stopped, the latch 22 rotates in the direction, in which the urging force of the spring 26 is applied, interlocking with the airvane 21 which is urged to pivot toward the carriage 25 by the spring 26. As a result, the latch 22 contacts a carriage fixing pin 29 provided on the carriage 25, thus preventing the carriage 25 from swinging in the radial direction of the disk 32, namely, toward the periphery of the disk 32. Thus, the head slider 23 mounted at the leading end of each arm on the carriage 25 is prevented from swinging from the landing zone 31 toward the periphery of the disk 32.

With the start of the rotation of the disk 32, an air flow is generated. The air flow acts on the airvane 21, thus rotating the airvane 21 against the urging force of the spring 26. Then, the latch 22 interlocked therewith rotates, thus disengaging from the fixing pin 29. As a result, the carriage 24 is unlocked from the latch 22. Then, the actuator 30 drives the carriage 25, with the result that the head slider 23 mounted on the leading end of each arm on the carriage 25 swings radially from the landing zone 31 to the recording region of the disk 32.

Upon stopping of the disk 32, the carriage 25 pivots, thus moving the head slider 23 on each arm to the landing zone 31. At this time, the airvane 21 returns to the stop position by the urging force of the spring 26 because the air flow is not generated when the disk 32 is not rotating. Consequently, the latch 22 contacts the fixing pin 29. As a result, the head slider 23 is locked in the landing zone 31.

In order to meet the demand for the development of a mass storage magnetic recording apparatus for storing an increased amount of information, it is necessary to increase the recording density and recording area of the disk. In order to increase the recording density, it is necessary to float the head slider a small distance above or below the disk surface. In order to increase the recording area, it is necessary to reduce the area of the non-recording region, for example, the landing zone of the carriage.

As described above, the above head slider is floated over the disk surface by positive pressure. The problem with the above conventional apparatus is that the gap between head slider and the disk surface cannot be reduced to less than a certain amount and the landing zone needs to be provided on the disk so that the head slider rests on the disk surface when the disk is not rotating. Thus, the apparatus is incapable of meeting the abovedescribed demand.

In order to solve the above problem, the following construction seems preferable. That is, the flexure always keeps the head slider out of contact with the disk surface, and in addition, an air flow generated by the rotation of the disk is applied to the region between a recess section formed on the bottom surface of the head slider and the disk so as to generate negative pressure in the region, for example, which is disclosed in U.S. Pat. No. 3,855,625. The head slider is drawn toward the disk surface by negative pressure sucking force. This construction allows the head slider to float above or below the disk with a small distance between the head slider and the disk surface even when the disk is rotating. Therefore, it is unnecessary to form the landing zone for the head slider. Hence, the apparatus is capable of processing a great amount of information.

The above-described head slider is elastically supported over the disk surface with a slight interval held therebetween when the disk is not in operation. The head slider is easily moved vertically when a shock or a vibration is applied to the apparatus. That is, there is a great possibility that the head slider will be brought into contact with the disk recording surface and damage the disk or the head slider. With to the above-described latch for regulating the movement of the carriage, the vertical movement of the head slider cannot be suppressed. Therefore, the head slider may damage the disk.

SUMMARY OF THE INVENTION

Accordingly, it is an essential object of the present invention is to provide a mass storage magnetic recording apparatus in which a head slider is controlled by negative pressure and yet in which the head slider is prevented from contacting the disk surface if subjected to a shock or a vibration from the apparatus. The present invention is applicable to a magnetic recording apparatus in which a head slider is controlled by positive pressure.

In accomplishing these and other objects, there is provided a magnetic recording apparatus comprising:

an arm having a head slider including a magnetic head at a leading end thereof and being moved by an actuator means between a scan position and a stop position, the arm scanning a surface of a disk for reading and/or writing information thereon at the scan position, the head slider being elastically supported on the arm by a flexure;

an airvane disposed adjacent to the disk, and being urged to a first position in opposition to a direction of air flow generated by rotation of the disk, the airvane moving in response to air flow generated by rotation of the disk to a second position in the direction of the air flow;

a regulating member provided at a position corresponding to the stop position of the arm and connected with the airvane, the regulating member moving between a regulating position for regulating movement of the flexure by contacting the flexure and a non-regulating position for moving away from the flexure; and an urging means for urging the airvane to the first position so that the flexure is not regulated by the regulating member when the disk is rotating.

According to the above construction, when the disk is rotating, the head slider elastically supported at the leading end of the arm by the flexure scans the disk surface while the arm is moved by the actuator means in the radial direction of the disk. Thus, the head slider writes information on the disk surface and reads information. When the disk stops rotating, the arm is locked at the predetermined position by the position regulating means and the flexure mounted on the arm at the leading end thereof is prevented from contacting the head slider with the disk surface by the regulating member provided at the stop position. Therefore, even though a shock or a vibration is applied to the apparatus when the disk is not in operation, the head slider is not brought into contact with the disk surface because the arm is locked and in addition, the flexure is prevented from allowing the head slider to contact the disk surface by the regulating member. Hence, the disk or the head slider is not damaged.

When the disk starts rotating, an air flow generated by the rotation of the disk acts on the airvane located in the vicinity of and over or below the disk surface. As a result, the airvane rotates against the force of the urging means in the direction in which the movement of the flexure is unlocked. At this time, the regulating member connected with the airvane rotates, interlocking with the airvane. Consequently, the flexure is unlocked from the regulating member. Thus, the head slider is capable of reliably scanning the disk surface.

BRIEF DESCRIPTION OF THE DRAWINGS

These and other objects and features of the present invention will become apparent from the following description taken in conjunction with the accompanying drawings, in which.

DETAILED DESCRIPTION OF THE INVENTION

Figure 1:
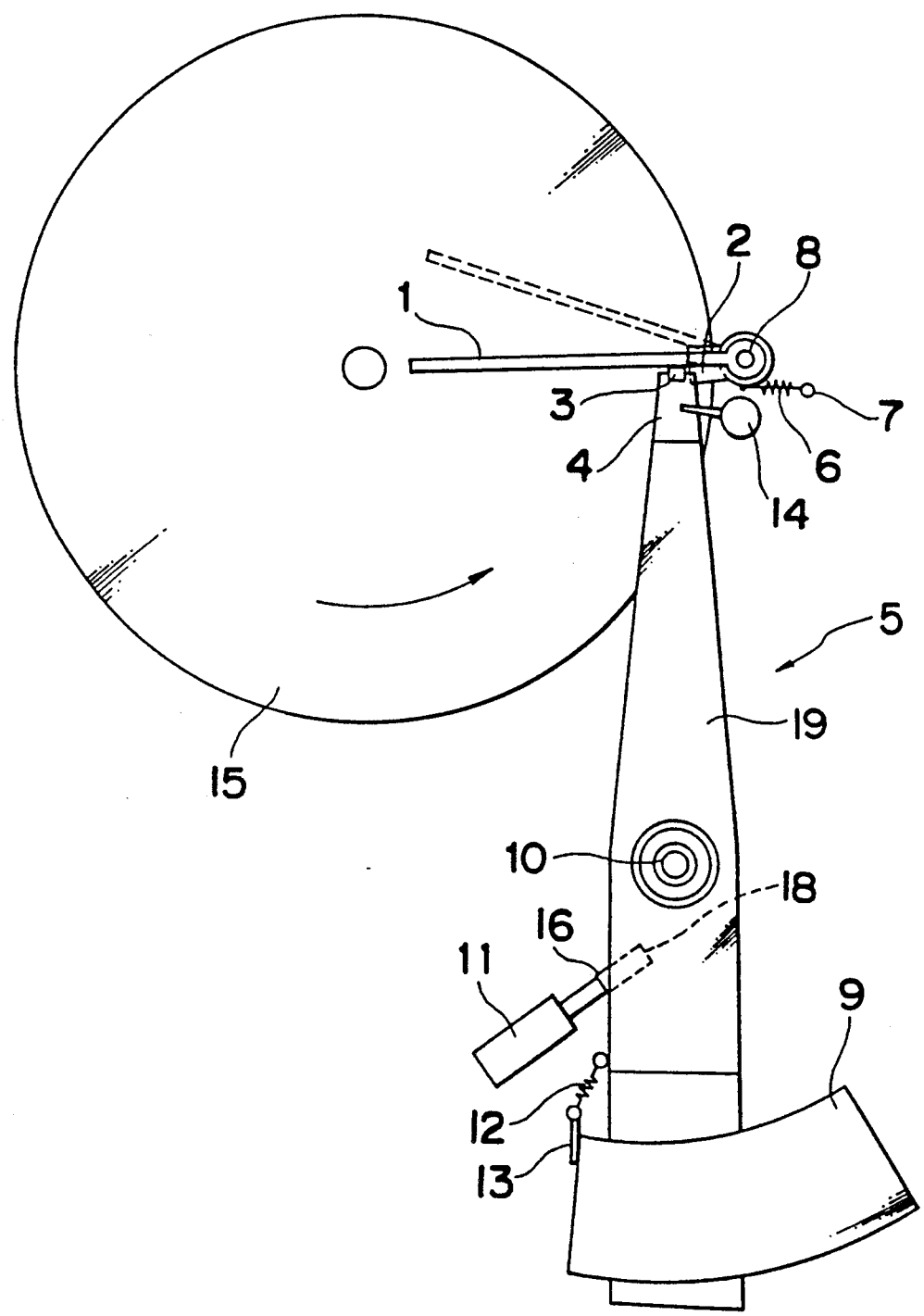
FIG. 1 is a plan view showing a schematic construction of a magnetic recording apparatus according to an embodiment of the present invention.

Before the description of the present invention proceeds, it is to be noted that like parts are designated by like reference numerals throughout the accompanying drawings.

Referring to FIGS. 1 through 4, a magnetic recording apparatus according to an embodiment of the present invention is described below.

Figure 2A:
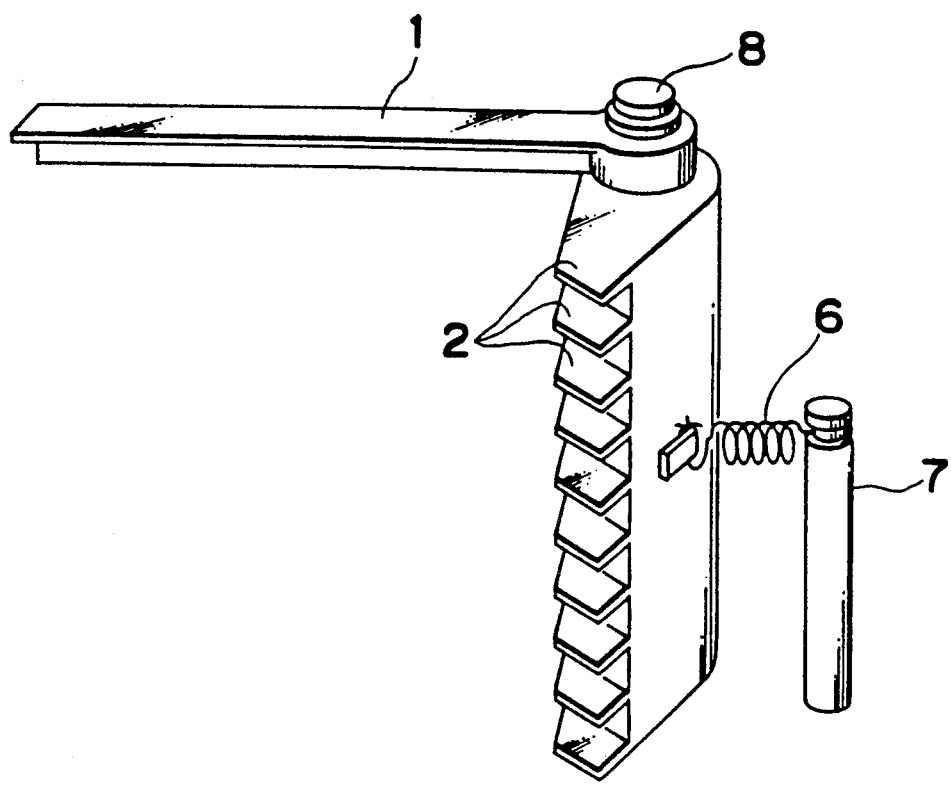
FIG. 2A is a perspective view showing a flexure receiving member.
Figure 2B:
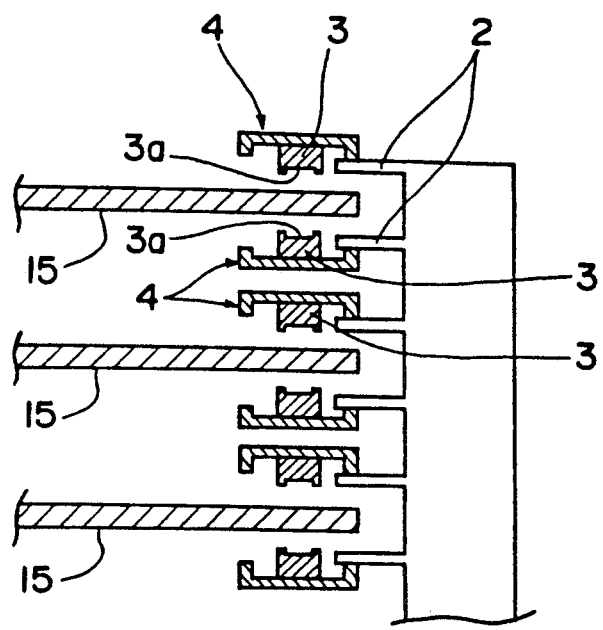
FIG. 2B is a sectional view showing the engagement of a flexure and the flexure receiving member which occurs when a magnetic disk is not rotating.

Referring to FIG. 1, there are a plurality of vertically stacked rotary disks 15 with regular intervals provided therebetween. Opposed to the upper and lower surface of each disk 15 is an arm 19 mounted on a carriage 5 pivotable about a carriage shaft 10. Each arm 19 carrier, a negative pressure type of floating head slider 3 which is fixed to the leading end of the arm 19 which moves the head slider 3 by a flexure 4 serving as a supporting member comprising an elastic material by which the head slider 3 is elastically supported on the arm 19. The flexure 4 has a widthwise cross-section which is U-shaped as shown in FIG. 2B. The head slider 3 is always floated over or below the corresponding disk 15, i.e., the head slider 3 is out of contact with the disk surface both when the disk 15 is rotating and not rotating.

Figure 2C:
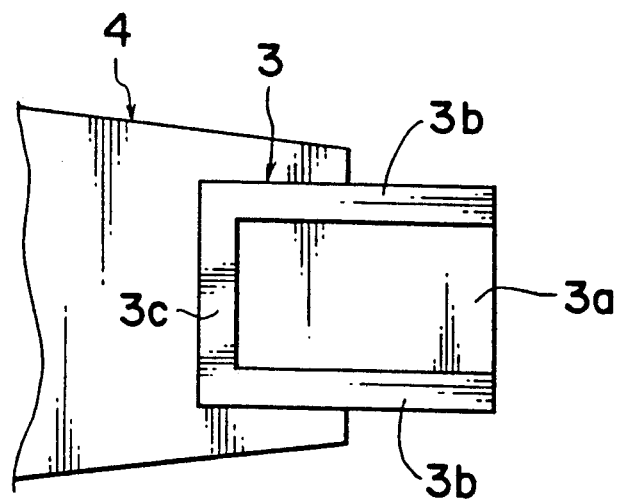
FIG. 2C is a bottom view of a head slider supported by the flexure.
Figure 3:
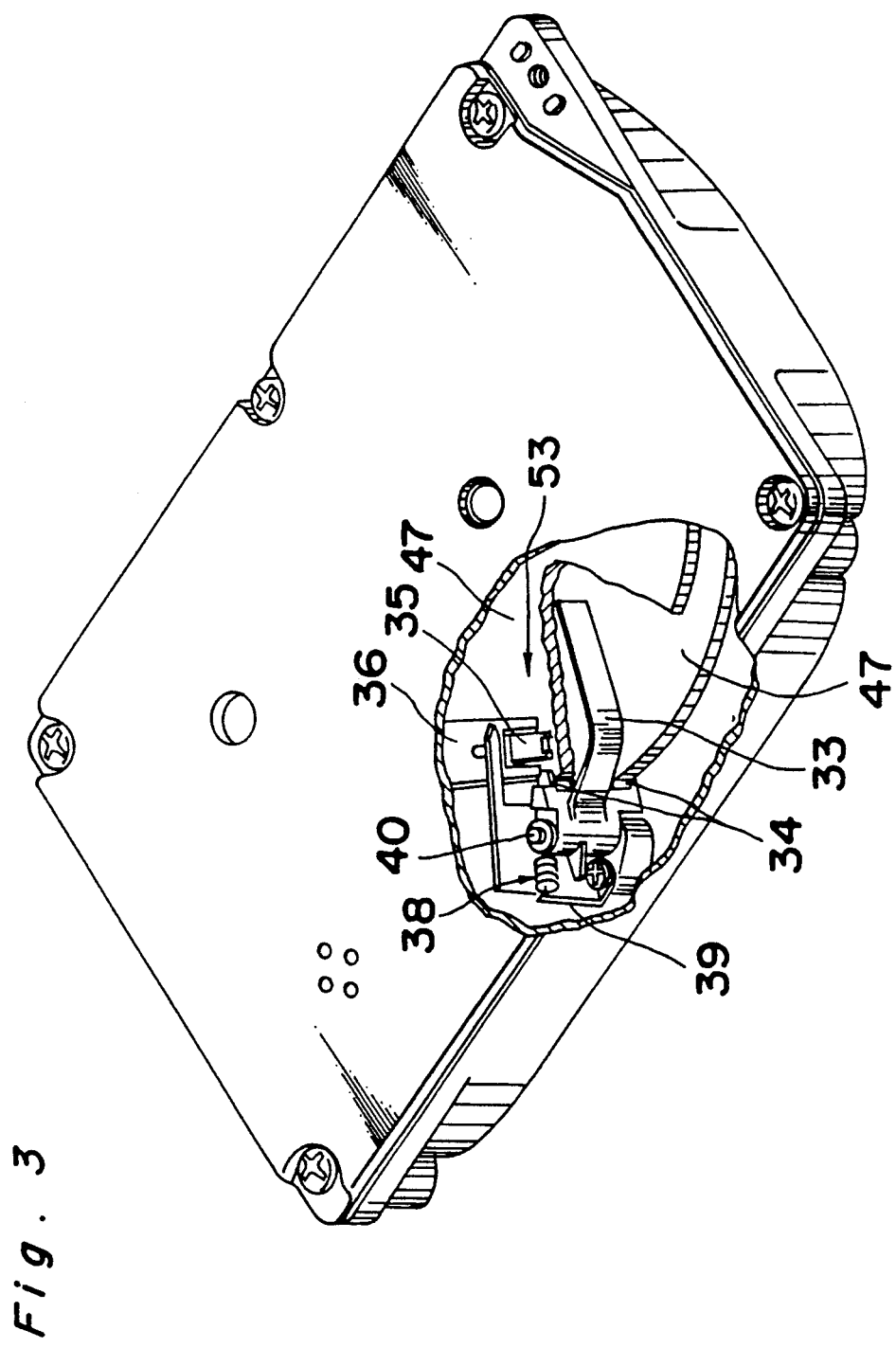
FIG. 3 is a perspective view, partially cutaway, showing schematic construction of a magnetic recording apparatus according to another embodiment of the present invention.

Each head slider 3 has a recess 3a formed on the bottom surface thereof so that an air flow generated by the rotation of the disk 15 is applied to the recess 3a. That is, two side rails 3b and a cross rail 3c joining the two rails 3b are formed on the bottom of the head slider 3 so that three rails 3b and 3c delineate the rectangular recess 3a as shown in FIG. 2C. With the rotation of the disk 15, a negative pressure is generated at the recess 3a and a positive pressure is generated at the rails 3b and 3c surrounding the recess 3a. The negative and positive pressures provide stability of the head slider 3 at the predetermined gap between the head slider 3 and the disk surface. The negative pressure sucking force is added to the load of the head slider 3 so as to cause the head slider 3 to approach the disk surface. When the disk 15 is not rotating, the head slider 3 is elastically supported by the flexure 4 with a gap held between the head slider 3 and the disk surface. The gap held when the disk 15 is not rotating is larger than the gap held when the disk 15 is rotating. The head slider 3 approaches the disk surface due to the negative pressure sucking force caused by the air flow generated by the rotation of the disk 15 in addition to an urging force applied to the head slider 3 by a loading/unloading mechanism 14. Thus, the head slider 3 exchanges information with the recording surface of the disk 15 with a predetermined gap, e.g. 10 μm or less, kept between the head slider 3 and the disk surface. The flexure 4 elastically supporting the head slider 3 is fixed to the leading end of the corresponding arm 19 on the carriage 5 for moving the head slider 3 over or under the disk surface in the radial direction of the disk 15. The carriage 5 is swung by an actuator 9 about the carriage shaft 10.

An air vane 1 positioned in the vicinity of and over or under one disk surface is rotatably mounted on a shaft 8. As shown in FIG. 2A, a flexure receiving member 2 serving as a regulating member for each flexure 4 is also mounted on the shaft 8 so that the flexure receiving member 2 rotates interlocking with the rotation of the air vane 1. Each flexure receiving member 2 is a projection protruding from the column portion mounted on the shaft 8. Each flexure receiving member 2 is opposed to the upper or lower surface of a corresponding disk 15 so that each flexure 4 opposed to the upper or lower surface of a corresponding disk 15 as shown in FIG. 2B does not move toward the disk surface when the disk 15 is not rotating. A spring 6 is mounted between a fixed shaft 7 and the shaft 8 and is connected with the air vane 1 as well as the column portion of the flexure receiving member 2 so as to urge the flexure receiving member 2 in the direction opposite to the rotational direction of the air vane 1 when a disk is driven.

A solenoid 11 is provided at a position corresponding with the lock position of the carriage 5. And a spring 12 is provided between the rear portion of the carriage 5 and a retraction plate 13 so as to urge the carriage 5 to the lock positon after the carriage 5 stops at a predetermined stop position in consequence of the stopping of the disks 15. When the carriage 5 stops at the predetermined stop position in consequence of the stopping of the disks 15 and moves to the lock position by the urging force of the spring 12, the solenoid 11 is turned off and a normally projected rod 16 is inserted into a lock opening 18 formed in the carriage 5 at the rear portion of the disks 15. Thus, the carriage 5 is prevented from moving from the lock position. The rod 16 is inserted into the lock opening 18 which extends diagonally with respect to the circumferential direction of the rear portion of the carriage 5 about the carriage shaft 10. Therefore, the carriage 5 can be reliably prevented from pivoting when a shock or a vibration is applied to the apparatus. This construction ensures an accurate positioning of the carriage 5.

When the disks 15 are not rotating, the air vane 1, the flexure receiving member 2, the carriage 5, and the flexures 4 are positioned as shown in FIG. 1. The vertical movement of each flexure 4 is blocked by the corresponding flexure receiving member 2. When a shock or a vibration is applied to the apparatus, each head slider 3 is prevented from contacting the disk surface. Hence, neither the disk 15 or the head slider 3 is damaged. In order to prevent the flexure 4 positioned at the leading end of an arm 19 from being unlocked from the flexure receiving member 2 due to a shock applied to the apparatus, the solenoid 11 is turned off to permit the rod 16 to be inserted into the opening 18 so as to prevent the pivotal motion of the carriage 5.

When the disks 15 start rotating counterclockwise, or in the direction shown by the arrow of FIG. 1, an air flow is generated in consequence of the rotation of each disk 15. The air vane 1 positioned in the vicinity of and over or under a disk surface is subjected to the action of the air flow. As a result, the air vance 1 rotates clockwise against the urging force of the spring 6 as shown by the dotted line of FIG. 1. The column portion supporting each flexure receiving member 2 and connected with the air vane 1 rotates together with the rotation of the air vane 1, thus freeing the flexures 4 from the flexure receiving members 2. Upon the rotation of the disks 15, the solenoid 11 is turned on to pull the rod 16 from the opening 18 of the carriage 5 so that the carriage 5 is unlocked. As a result, each head slider 3 is pressed with a predetermined load by the loading/unloading mechanism 14, thus floating over or under the corresponding disk 15 with a predetermined slight gap kept therebetween. The head slider 3 approaches the disk surface due to the negative pressure sucking force caused by the air flow generated by the rotation of the disk 15 in addition to the pressing force of the loading/unloading mechanism 14, so that the predetermined gap, e.g. 10 μm or less, is kept between the head slider 3 and the disk surface. Thus, the head slider 3 exchanges information with the recording surface of the corresponding disk 15 with the predetermined gap.

Upon stopping of the disks 15, the carriage 5 returns to the stop position. Then, the spring 12 moves the carriage 5 to the lock position at which the solenoid 11 is turned and the rod 16 is inserted into the opening 18 of the carriage 5. Thus, the carriage 5 is locked at its lock position. With the decelerated speed of the air flow, each flexure 4 is supported by the corresponding flexure receiving member 2 which is returned to its stop position together with the air vane 1 which is being returned to its stop position by the urging force of the spring 6. Thus, each flexure 4 is locked at its stop position.

As described above, when the disks 15 have stopped rotating, the carriage 5 is locked by the carriage locking device and each flexure receiving member 2 prevents the flexure 4 from moving toward the disk 15. Therefore, even though a shock or vibration is applied to the apparatus, the head slider 3 is prevented from contacting the disk 15.

Another embodiment of the present invention is described below with reference to FIG. 3 through FIG. 12.

Referring to FIGS. 3-9, there are a plurality of magnetic disks 47 with regular intervals provided therebetween. A carriage 37 includes arms 53 on each side of each disk and each having a head slider 35, and a flexure 36. Opposed to the upper or lower surface of each disk 47, a negative pressure type of floating head slider 35 is supported by the corresponding flexure 36, made of stainless steel, comprising an elastic material such as ABS resin. The head slider 35 is always floated over or under the corresponding disk 47, i.e., the head slider 35 is out of contact with the disk surface both when the disk 47 is rotating and not rotating.

Each head slider 35 has a recess 35a defined by side rails 35b and a cross rail on the bottom surface thereof similar to the head slider 3 shown in FIG. 2C. When an air flow generated by the rotation of a disk 47 passes through a slight gap between the head slider 35 and the disk 47, negative pressure is generated in the recess 35a by the expansion of the air flowing in the recess 35a. Information is written on the recording surface of the disk 47 or read therefrom with a predetermined gap maintained between the disk 47 and the head slider 35 by the balance among negative pressure sucking force generated in the recess 35a of the head slider 35, positive pressure generated on the rails 35b of the head slider 35, and the elastic force of the flexure 36. When the disk 47 is not rotating, the head slider 35 supported by the flexure 36 is not subjected to the negative pressure sucking force. Therefore, a gap is maintained between the head slider 35 and the disk 47 by the elasticity of the flexure 36. The gap when the disk 47 is not rotating is larger than the gap when the disk 47 is rotating. The flexure 36 elastically supporting each head slider 35 is mounted on the leading end of the corresponding arm 53 on the carriage 37 for moving the head slider 35 above or below the corresponding disk 47 in the radial direction of the disk 47. An actuator 41 drives the carriage 37 to swing about a carriage shaft 42.

Figure 4:
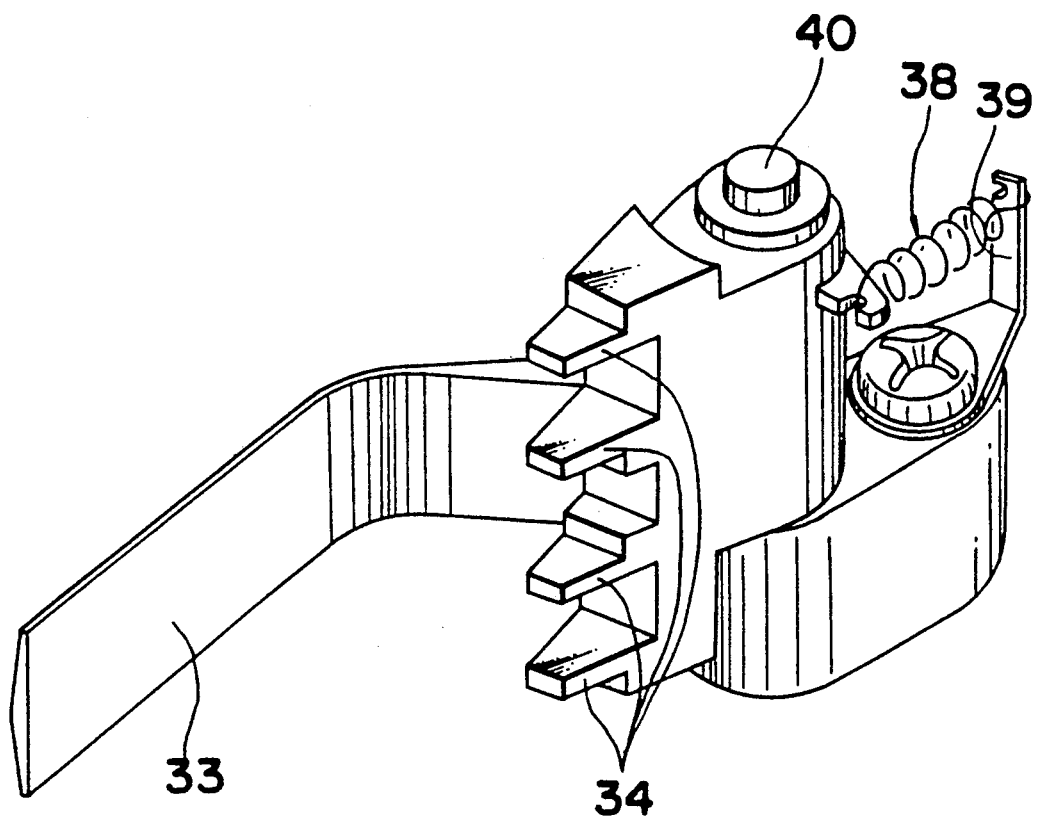
FIG. 4 is a perspective view showing a flexure receiving member shown in FIG. 3.
Figure 7:
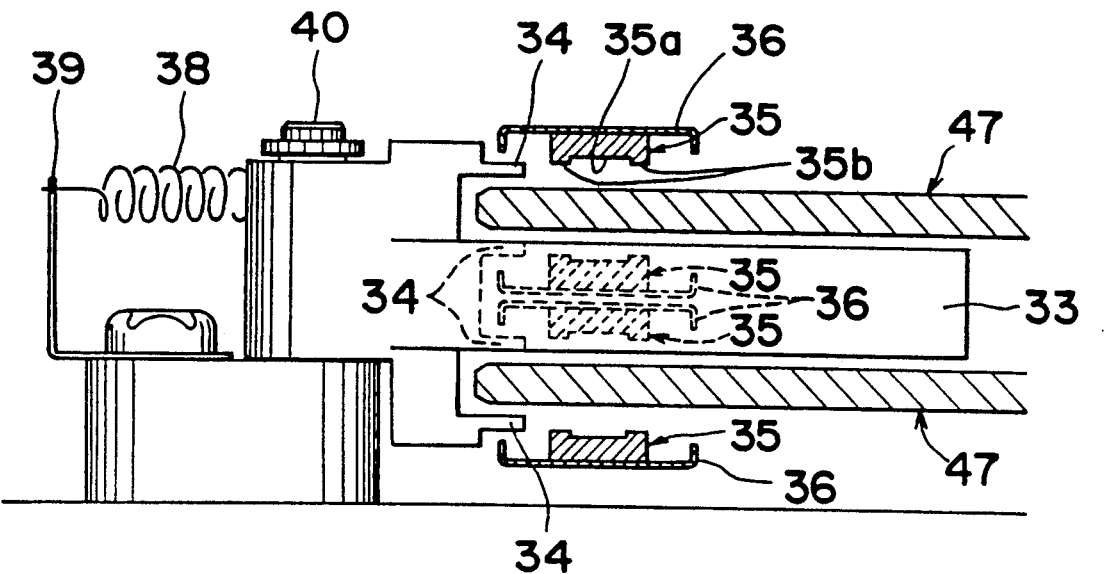
FIGS. 7 and 8 are sectional views showing the engagement of a flexure and the flexure receiving member when the disk is not rotating and when the disk is rotating, respectively.

An air vane 33 positioned in the vicinity of and over or under a disk surface is mounted on a column portion rotatably mounted on a shaft 40. As shown in FIG. 4, a plurality of flexure receiving members 34 are also provided on a column portion mounted on the shaft 40 so that the flexure receiving members 34 rotate interlocking with the rotation of the air vane 33. Each flexure receiving member 34 is a projection protruding from the column portion mounted on the shaft 40. Each flexure receiving member 34 is opposed to the upper or lower surface of a corresponding disk 47 so that each flexure 36 opposed to the upper or lower surface of a disk 47 as shown in FIG. 7 does not move toward a disk surface when the disks 47 are not rotating. A spring 38 is mounted between a fixed shaft 39 and the column portion carrying the air vane 33 as well as the flexure receiving members 34 so as to urge the flexure receiving members 34 in the direction opposite to the rotational direction in which the air vane 33 is moved by air from the disks.

A coil 49 is molded in a resin to form a molded element 50 mounted on the carriage 37 on the end opposite to the end carrying the arms 53 each with a head slider 35. One side surface 50a of the molded element 50 contacts a peripheral stopper 48 at a predetermined peripheral stop positon of the leading end of the carriage 37 when the disks 47 are not rotating. A cut-out 50b is formed in the molded element 50 at a position opposite to the face 50a at which the mold 50 contacts the stopper 48. When the disks 47 are not rotating, the leading end of a regulating arm 44 rotatably mounted on a shaft 45 engages the cut-out 50b by the urging force of a spring 51 so as to prevent the carriage 37 from moving from the above-described peripheral stop position toward the center of the disk 47. The leading end of the regulating arm 44 engages the cut-out 50b in parallel with the pivotal direction of the molded element 50 on the carriage 37 about the shaft 42. Therefore, even though a shock or a vibration is applied from the outside to the apparatus, the pivotal motion of the carriage 37 can be reliably suppressed when the disks 47 are not rotating. Thus, the carriage 37 can be positioned with a high accuracy.

Figure 5:
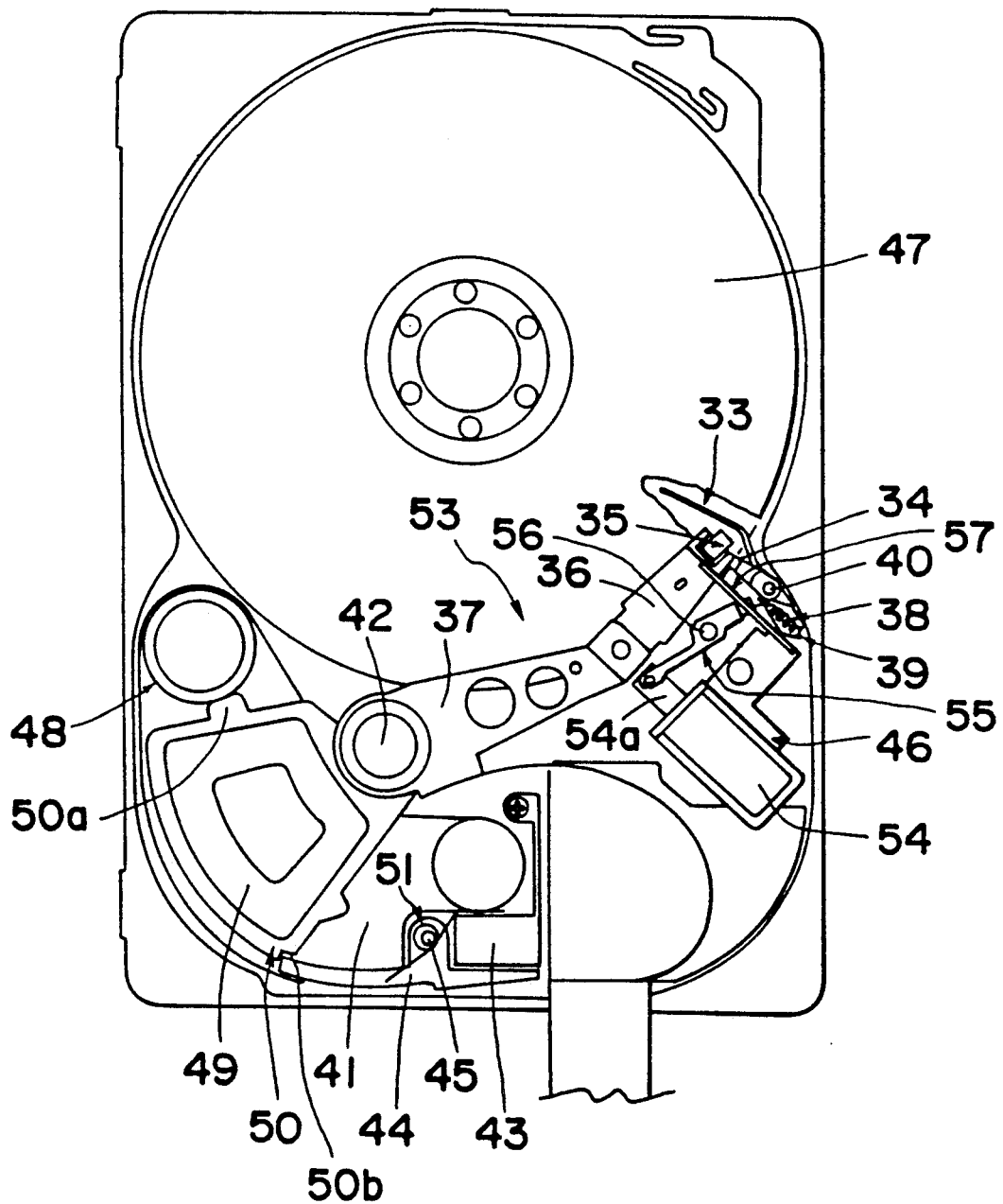
FIG. 5 is a plan view of the apparatus of FIG. 3 showing the operation of the flexure receiving member to be performed when the magnetic disk is rotating.

When the disks 47 are not operating, the airvane 33, the flexure receiving members 34, the carriage 37, and the flexures 36 are positioned as shown in FIGS. 5 and 7. The vertical movement of each the flexure 36 is suppressed by the corresponding flexure receiving member 34. When a shock or a vibration is applied to the apparatus, each head slider 35 is prevented from contacting the disk surface. Hence, neither the disks 47 or the head slider 35 are damaged.

In order to prevent the flexures 36 positioned at the leading end of the arms 53 on carriage 37 from being unlocked from the flexure receiving members 34 as a result of pivotal motion of the carriage 37 toward the center of the disks 47 due to a shock or a vibration applied to the apparatus, the regulating arm 44 engages the cut-away 50b formed in the mold 50 which joins the carriage 37 and the coil 49 with each other. Thus, the pivotal motion of the carriage 37 can be prevented.

Figure 6:
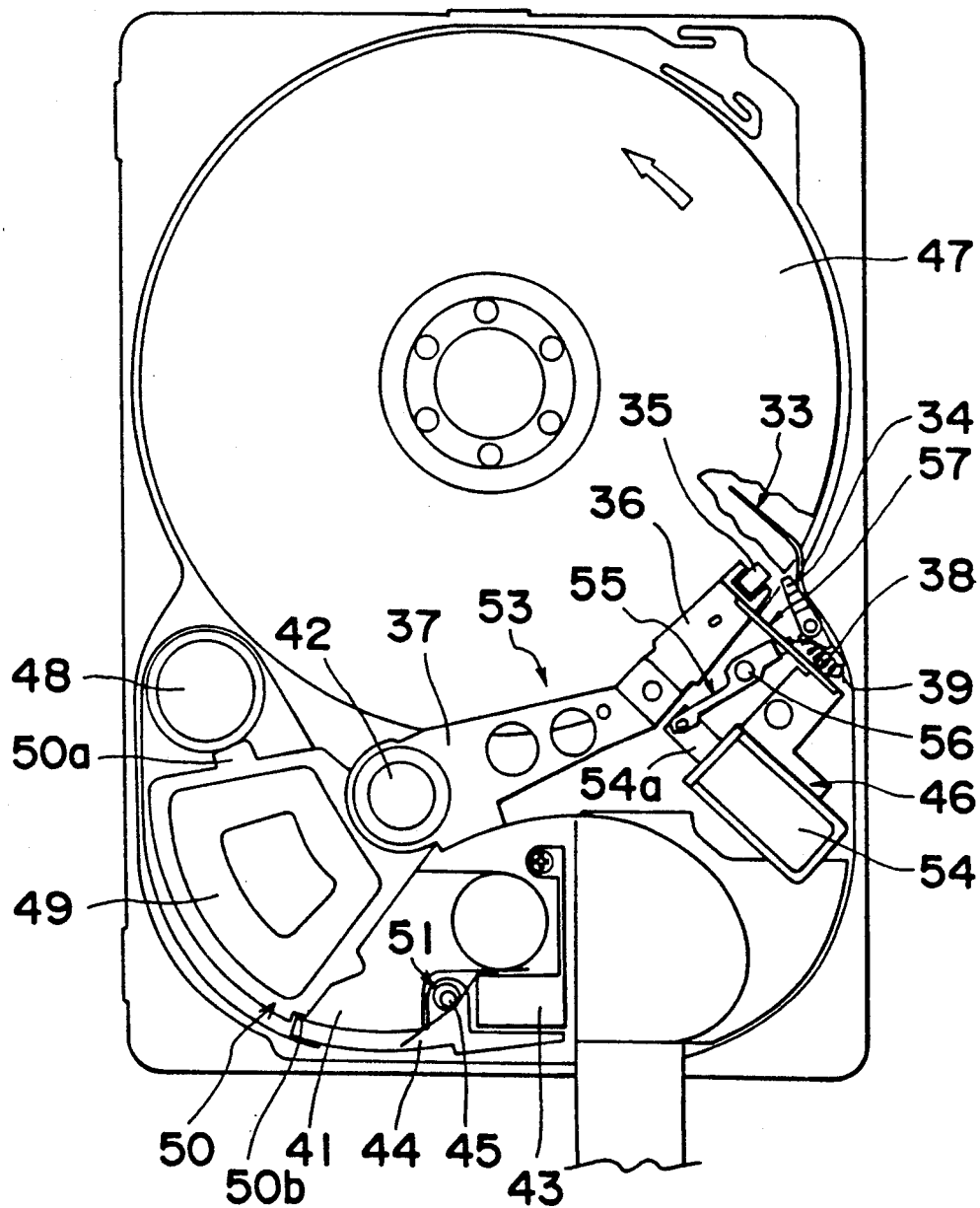
FIG. 6 is a plan view similar to FIG. 5 showing the engagement of a flexure and a flexure receiving member which occurs when a magnetic disk is not rotating.
Figure 8:
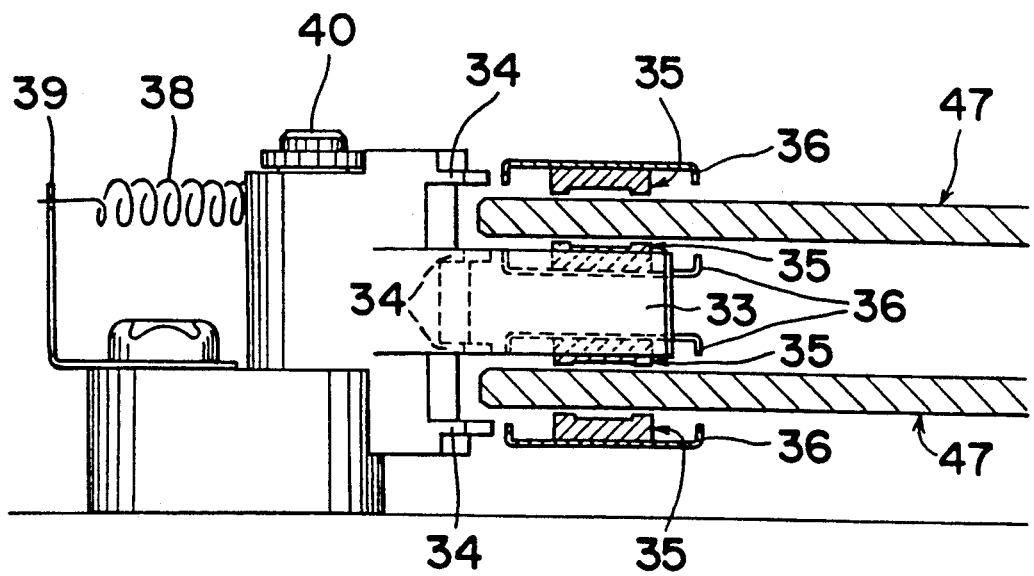
Figure 9:
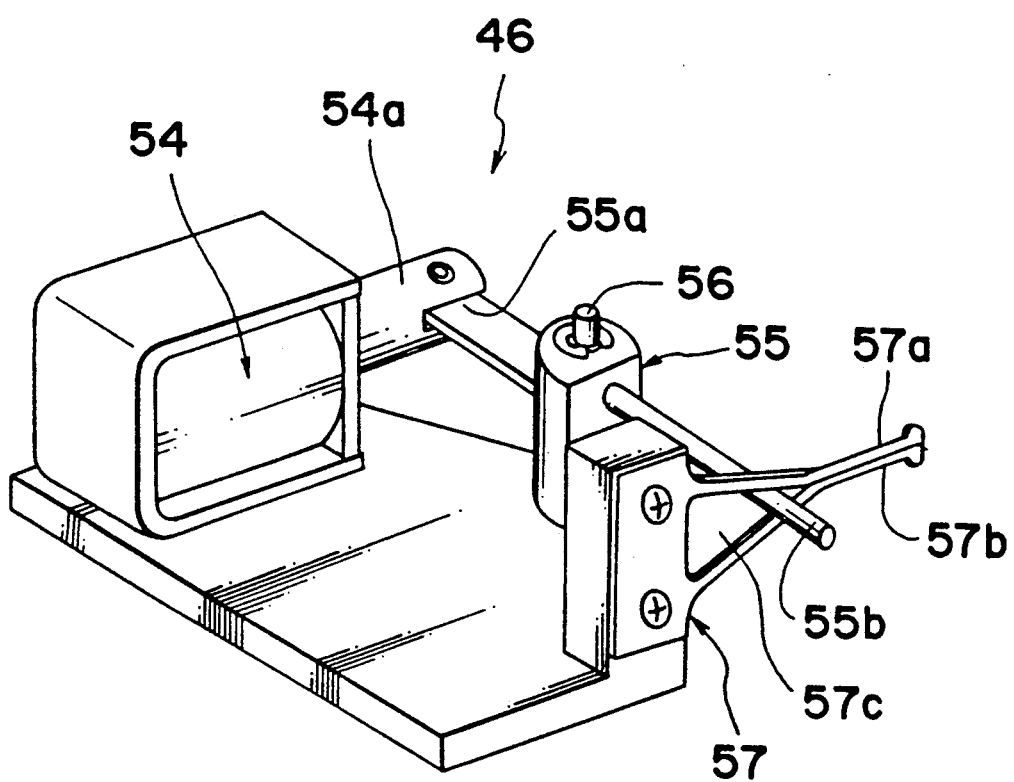
FIG. 9 is a perspective view showing the operation of a loading/unloading mechanism.

When the disks 47 start rotating counterclockwise, or in the direction shown by the arrow of FIG. 6, an air flow is generated in consequence of the rotation of the disks 47. The air vane 33 positioned in the vicinity of a disk surface is subjected to the action of the air flow. As a result, the air vane 33 rotates clockwise against the urging force of the spring 38 as shown in FIG. 6. The column portion carrying the flexure receiving members 34 and connected with the air vane 33 rotates together with the rotation of the air vane 33, thus releasing the flexures 36 therefrom as shown in FIG. 8. Thus, each flexure 36 is capable of swinging counterclockwise. With the rotation of the disks 47, the solenoid 43 is turned on to disengage the regulating arm 44 from the cut-away 50b in the mold 50 so as to unlock the carriage 37.

Figure 10:
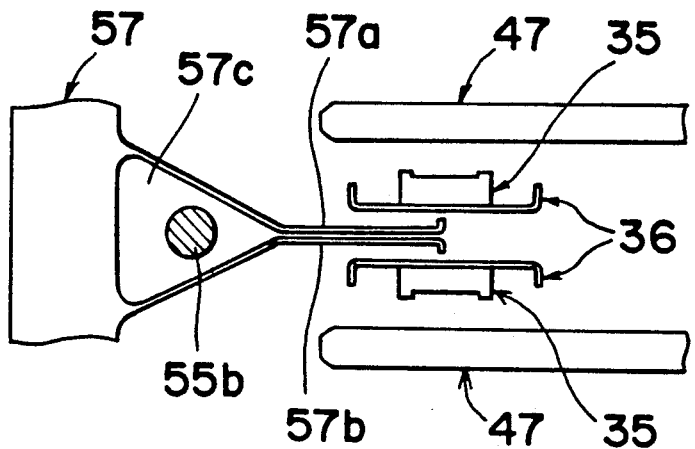
FIGS. 10-12 are sectional views showing the operation of the loading/unloading mechanism.
Figure 11:
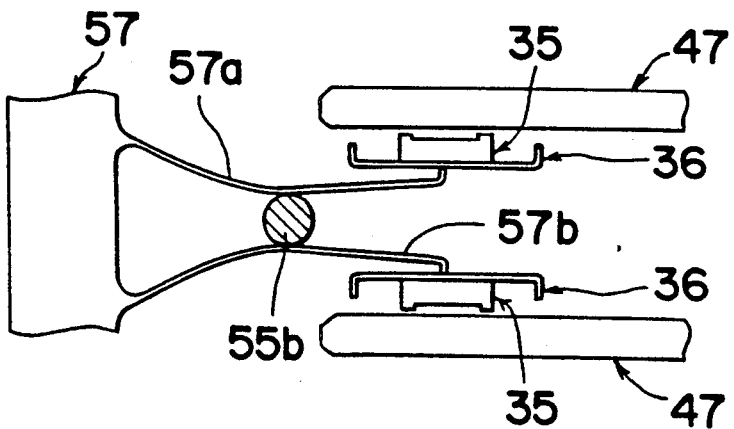
Figure 12:
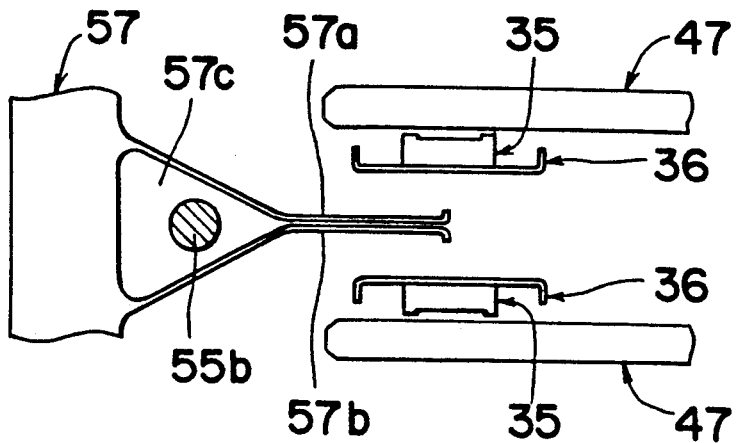

As a result, the head sliders 35 are pressed with a predetermined load by a loading/unloading mechanism 46, thus floating over or below the disks 47 with a predetermined slight gap kept therebetween. The loading-/unloading mechanism 46 has a solenoid 54, a driving arm 55, and a pressing member 57. The movable rod 54a of the solenoid 54 is connected with one end 55a of the driving arm 55. The driving arm 55 rotates about a shaft 56 in response to the backward and forward movement of the rod 54a of the solenoid 54 upon turning on and off the solenoid 54. The pressing member 57 has two flexible legs 57a and 57b forming a triangular space 57c at the inenr ends of the legs 57a and 57b and contacting with each other at the free ends thereof. The other end 55b of the driving arm 55 is inserted into the triangular space 57c and then according to the rotational movement of the driving arm 55, the other end 55b of the driving arm 55 moves to separate the legs 57a and 57b contacting with each other from each other. Each of the legs 57a and 57b is provided near a corresponding flexure 36, that is, below or above the flexure 36 so as to contact and press the flexure 36 as shown in FIGS. 10-12. Therefore, when the solenoid 54 is turned on to rotate the driving arm 55 about the shaft 56 counterclockwise, the other end 55b of the driving arm 55 moves to separate the contacting legs 57a and 57b from each other as shown in FIGS. 10 and 11. Then, the legs 57 and 57b move upward and downward to press the respective flexures 36 to cause each head slider 35 to move toward the disk surface in FIG. 11. After the head slider 35 approaches the disk surface and is held at the predetermined gap therebetween by utilizing the negative pressure, the solenoid 54 is turned off to rotate the driving arm 55 about the shaft 56 clockwise and then the other end 55b of the driving arm 55 returns to the position where the other end 55b thereof is located in the space 57c to permit the legs 57a and 57b to contact each other. Even though the legs 57a and 57b move away from the flexures 36, each head silder 35 is held at the position where the predetermined gap is held between the head slider 35 and the disk surface by the negative pressure as shown in FIG. 12.

Upon stopping of the disks 47, the carriage 37 returns to the predetermined peripheral stop position. When the solenoid 43 is turned off, the regulating arm 44 rotates clockwise about the shaft 45 by the urging force of the spring 51, thus engaging the cut-away 50b of the mold 50. Thus, the carriage 37 is locked. With the decelerated rotational speed of the disks 47, each head slider 35 moves away from the corresponding disk 47 when the negative pressure sucking force generated in the slight gap between the head slider 35 and the disk 47 becomes smaller than the positive pressure generated in the slight gap therebetween and the elastic force of the flexure 36.

With this decelerated rotational speed of the disks 47, the rotational force on the air vane 33 is reduced because the speed of the air flow has been decelerated. The column portion carrying the flexure receiving members 34 and connected with the air vane 33 rotaets with the air vane 33 which is rotating counterclockwise by the urging force of the spring 38. Thus, the flexure receiving members 34 return to the predetermined stop position, thus preventing the flexures 36 from pivoting toward the recording surface of the disks 47.

As described above, when the disks 47 are not rotating, each flexure receiving member 34 prevents the corresponding flexure 36 from pivoting toward the disk 47. Therefore, even though a shock or a vibration is applied from the outside to the apparatus, each head slider 35 is prevent from contacting the corresponding disk 47.

Figure 13:
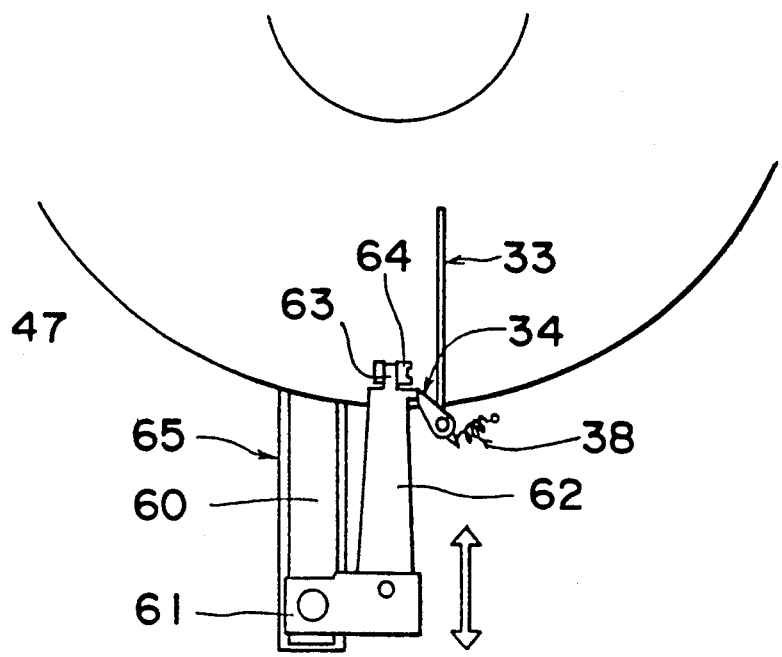
FIGS. 13 and 14 are plan views showing a modification of the present invention in which an arm linearly moves in the radial direction of the disk, when the disk is not rotating and when the disk is rotating, respectively.
Figure 14:
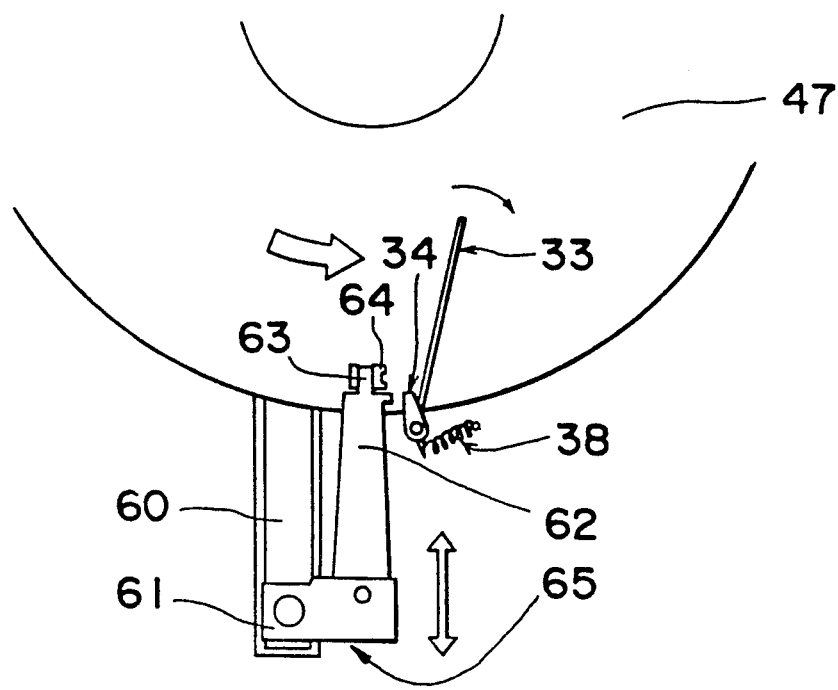

In the foregoing embodiments, the carriage rotates about a shaft to cause the arms scan the disks, but the arm may linearly move in a radial direction of the disk as shown in FIGS. 13 and 14. The arm 65 can move linearly backward and forward along a rail guide 60 in the radial direction of the disk 47 through a connecting member 61 for connecting the guide 60 with the arm 62 and which acts as a carriage 65 for the arm 62. That is, the arm 62 moves linearly toward the center of the disk 47 upon the rotation of the disk 47 and the arm 62 moves linearly away from the disk 47 when the rotation of the disk 47 stops. The arm 62 is carried in the carriage 65, and has a flexure 63, and a head slider 64 similarly to those of the above embodiments. The flexure receiving member 34 operates similarly to those of the above embodiments to prevent the head slider 64 from contacting the disk surface when the disk 47 is stopped and moves away from the flexure 63 upon the rotation of the disk 47 and movement of vane 33.

In the above embodiments, the head slider is floated above or below the disk by utilizing negative pressure, but as shown in FIGS. 15-18, the head slider may be floated thereby utilizing positive pressure by preventing the head slider from contacting the disk surface even when the disk is not rotating.

Figure 15:
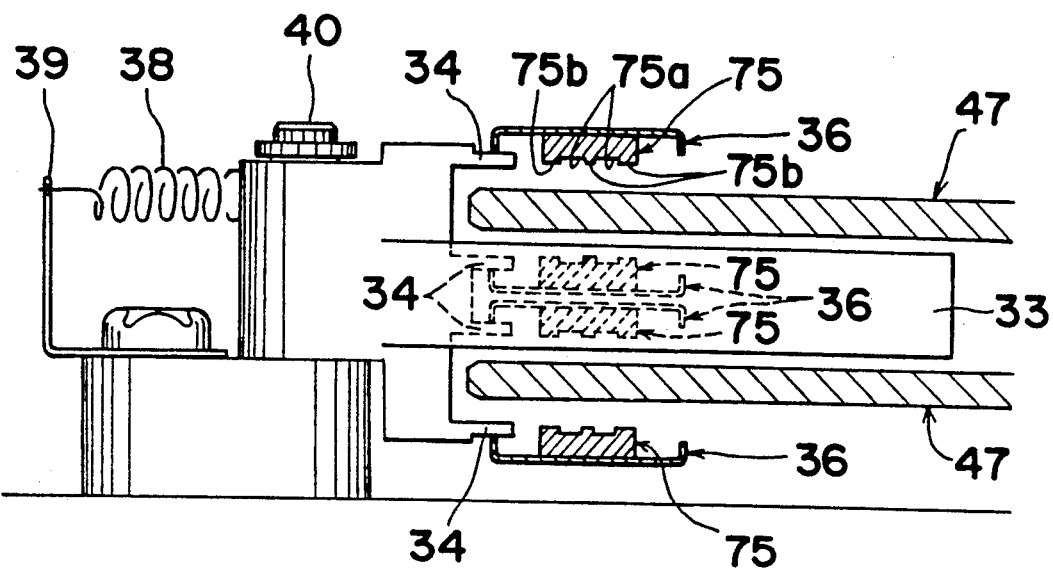
FIGS. 15 and 16 are sectional views showing the engagement of a flexure and a flexure receiving member according to a further modification of the present invention when the disk is not rotating and when the disk is rotating, respectively.
Figure 16:
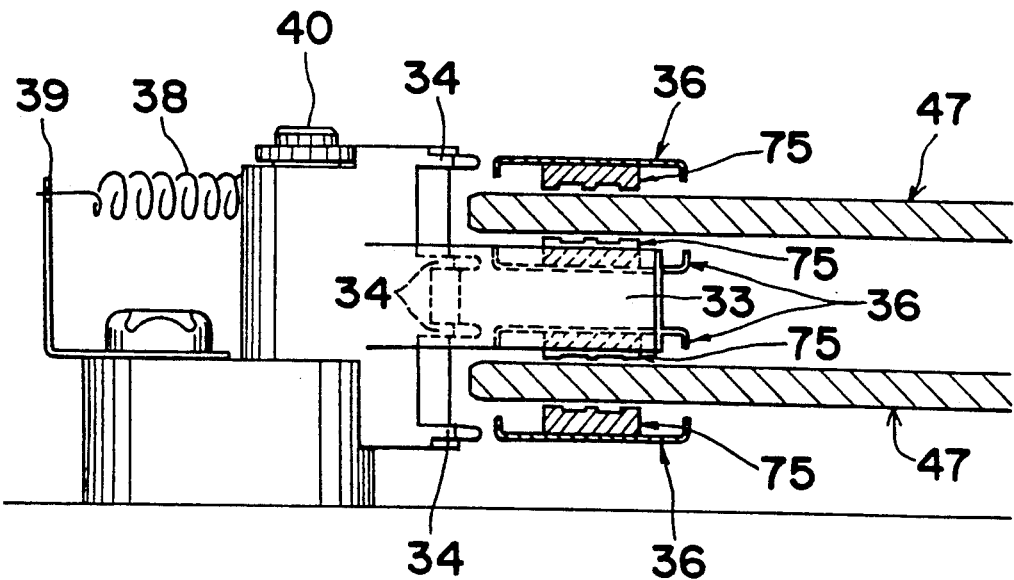
Figure 17:
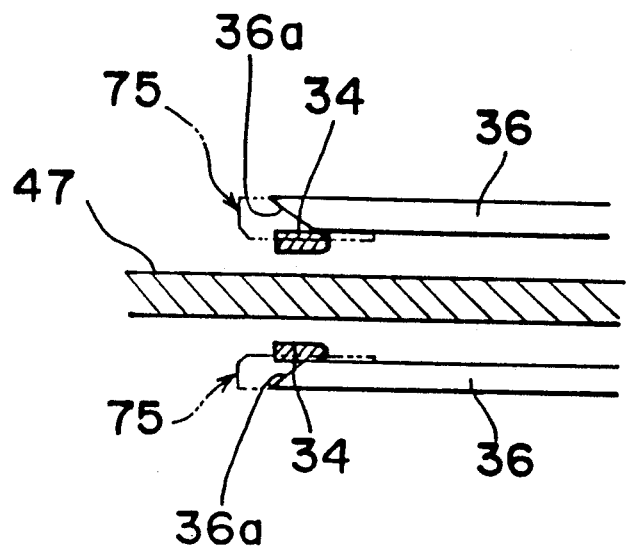
FIGS. 17 and 18 are sectional views showing the head slider and the head slider receiving member shown in FIGS. 15 and 16 when the disk is not rotating and when the disk is rotating, respectively.
Figure 18:
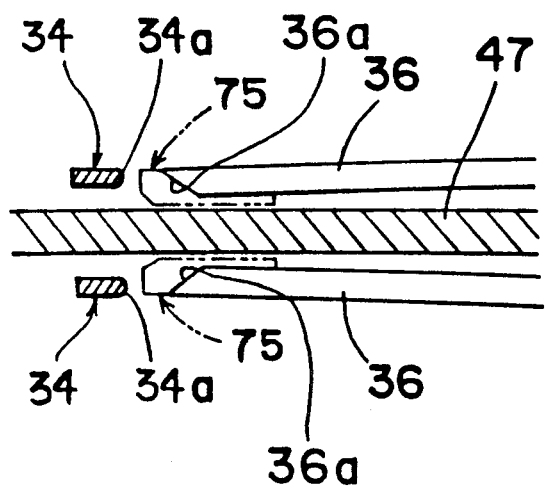
Figure 19:
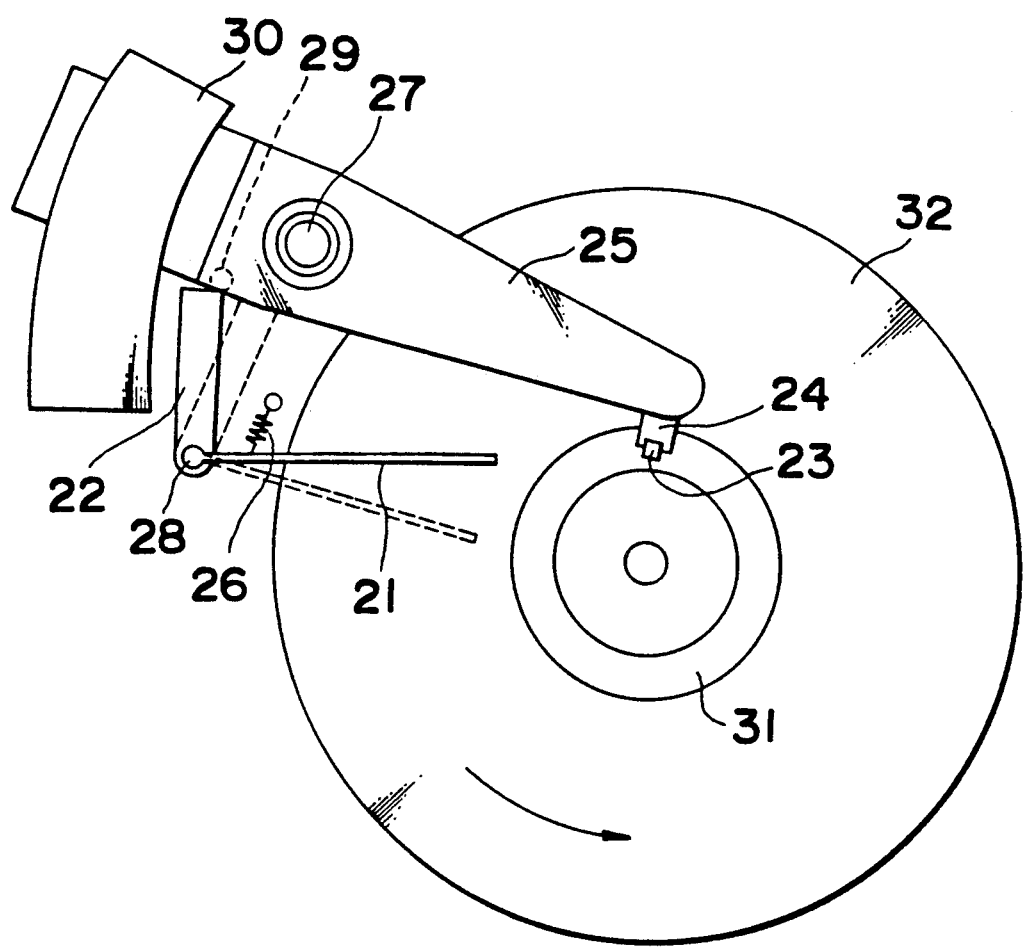
FIG. 19 is a plan view showing a schematic construction of a conventional magnetic recording apparatus.
Figure 20:
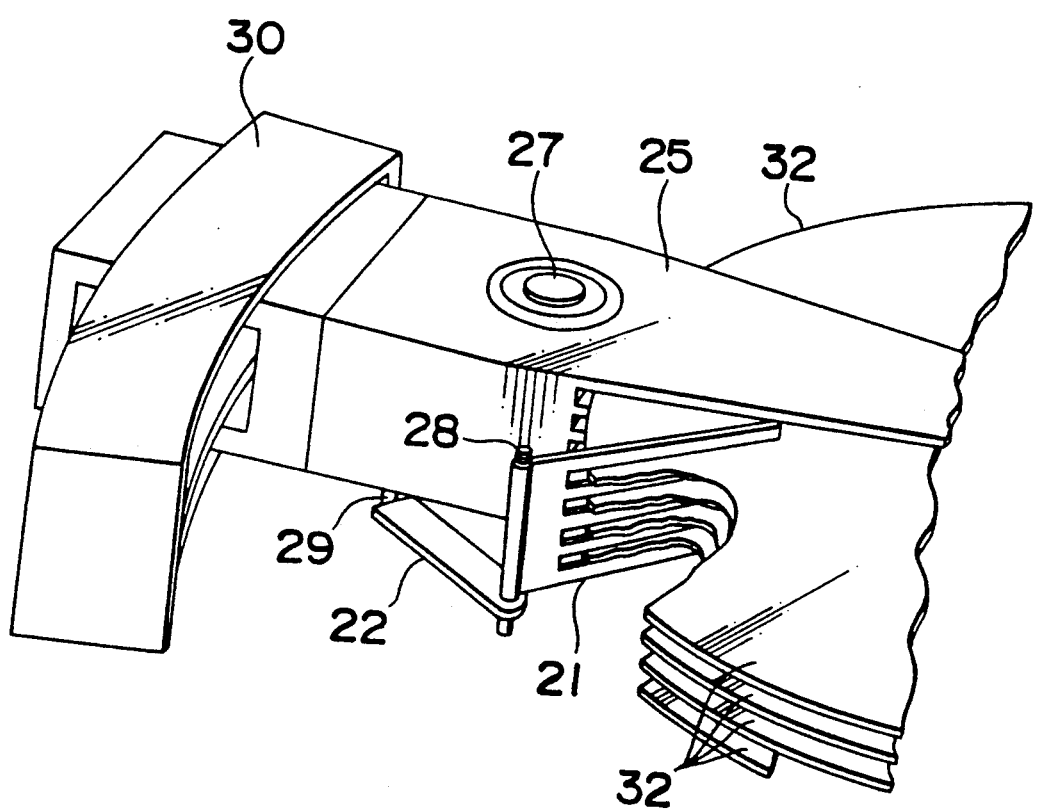
FIG. 20 is a perspective view, partially cutaway, showing a schematic construction of the conventional magnetic recording apparatus.

In FIGS. 15 and 16, each head slider 75 has two elongated recesses 75a and three elongated side rails 75b on the disk-facing surface thereof and is supported by a flexure 36 similarly to the head slider 35 of the embodiments of FIGS. 3-14. The flexure receiving member 34 operates similarly to those of the above embodiments to prevent the head slider 75 from contacting the disk surface when the disks 47 are stopped as shown in FIGS. 15 and 17 and move away from the flexure 36 upon the rotation of the disks 47 as shown in FIGS. 16 and 18. Each flexure 36 has a tapered surface 36a at the end thereof, so that a round portion 34a of the flexure receiving member 34 contacts the tapered surface 36a of the flexure 36 to smoothly slide the flexure receiving member 34 from the tapered surface 36a to the disk-facing surface of the flexure 36. Therefore, each flexure receiving member 34 moves away from the flexure 36 upon the rotation of the disks 47 as shown in FIG. 18, while each flexure receiving member 34 contacts the disk-facing surface of the flexure 36 through the tapered surface 36a thereof to prevent the head slider 75 from contacting the disk surface when the disks 47 are stopped as shown in FIG. 17.

The arm may have the flexure and the head slider supported at the leading end of the flexure without a carriage. Then, the flexure may rotate or move to perform the above operations instead of the carriage.

According to the present invention, when a disk is not rotating, the flexure supporting the head slider elastically is prevented from moving vertically and the arm supporting the flexure is locked at the predetermined position. Therefore, even though a shock or a vibration is applied to the apparatus, the head slider is prevented from contacting the disk. When the disk starts rotating, all locking members are unlocked to allow the head slider to reliably scan the recording surface of the disk. Thus, according to the apparatus, the recording density and recording area of the disk can be increased compared with the conventional one.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A magnetic recording apparatus comprising:
   an arm having a head slider including a magnetic head at a leading end thereof and being moved by an actuator means between a scan position and a stop position, the arm scanning a surface of a disk for reading and/or writing information thereon at the scan position, the head slider being elastically support on the arm by a flexure;
   an air vance disposed adjacent to the disk, and being movable to a first position in oppositon to a direction of air flow generated by rotation of the disk, the air vane being movable in response to air flow generated by rotation of the disk to a second position in the direction of the air flow;
   a regulating member provided at a position corresponding to the stop position of the arm and connected with the air vane, the regulating member moving between a regulating position for regulating movement of the flexure by contacting the flexure and a non-regulating positon for moving away from the flexure; and
   an urging means for urging the air vane to the first position so that the flexure is regulated by the regulating member when the disk is not rotating.

2. The magnetic recording apparatus as claimed in claim 1, further comprising an arm regulating means for locking the arm at a predetermined position when the disk is not rotating.

3. The magnetic recording apparatus as claimed in claim 1, wherein the regulating member is a flexure receiving member for contacting the flexure to prevent the head slider from contacting a surface of the disk.

4. The magnetic recording apparatus as claimed in claim 1, further comprising a carriage supporting said arm with the flexure at a free end thereof, and a shaft about which the carriage rotates from the stop position to the scan position.

5. The magnetic recording apparatus as claimed in claim 1, further comprising a carriage supporting said arm with the flexure at a free end thereof, and the carriage is linearly movable from the stop position to the scan position.

* * * * *